United States Patent [19]

Shearn et al.

[11] Patent Number: 5,618,323
[45] Date of Patent: Apr. 8, 1997

[54] INTEGRAL CAB AND ENGINE AIR INTAKE SYSTEM FOR A VEHICLE

[75] Inventors: Kenneth M. Shearn, Maple Valley; Gerald J. Angelo, Redmond, both of Wash.

[73] Assignee: PACCAR Inc, Bellevue, Wash.

[21] Appl. No.: 520,046

[22] Filed: Aug. 28, 1995

Related U.S. Application Data

[63] Continuation of Ser. No. 188,541, Jan. 28, 1994, abandoned.

[51] Int. Cl.$^6$ ................................................. B01D 45/04
[52] U.S. Cl. ..................... 55/385.3; 95/31; 95/267; 55/418; 55/434; 55/465; 55/DIG. 28; 180/68.3; 180/69.25; 454/108; 454/147
[58] Field of Search ...................... 95/31, 267; 55/385.3, 55/DIG. 28, 418, 462, 434, 465; 454/107, 108, 147, 148; 180/68.3, 69.25, 69.21

[56] References Cited

U.S. PATENT DOCUMENTS

| | | | |
|---|---|---|---|
| 752,386 | 2/1904 | Dunlop et al. | 181/274 |
| 1,855,038 | 4/1932 | Walker | 180/68.3 |
| 1,859,644 | 5/1932 | Altgelt | 261/2 |
| 1,873,252 | 8/1932 | Altgelt | 180/68.3 |
| 1,934,463 | 11/1933 | Hartsock | 181/229 |
| 1,953,785 | 4/1934 | Sullivan | 183/51 |
| 2,036,485 | 4/1936 | Lintern et al. | 296/137 |
| 2,037,884 | 4/1936 | Day | 137/160 |
| 2,133,316 | 10/1938 | Altgelt | 183/24 |
| 2,299,157 | 10/1942 | Lowther | 189/54 |
| 2,564,814 | 8/1951 | Perrin | 183/73 |
| 2,701,024 | 2/1955 | Thomas | 180/69 |
| 2,766,836 | 10/1956 | Fessia | 180/54 |
| 2,780,076 | 2/1957 | McLean | 454/148 |
| 2,852,997 | 9/1958 | Leslie et al. | 454/147 |
| 2,881,860 | 4/1959 | Ternes | 183/62 |
| 2,952,327 | 9/1960 | Farr | 180/69 |
| 3,232,368 | 2/1966 | Sullivan | 180/69 |
| 3,249,172 | 5/1966 | De Lorean | 180/69 |
| 3,259,051 | 7/1966 | Boche et al. | 454/137 |
| 3,301,484 | 1/1967 | De Castelet | 454/148 |
| 3,451,469 | 6/1969 | Hall et al. | 165/41 |
| 3,481,117 | 12/1969 | McKinlay | 55/385.3 |
| 3,641,744 | 2/1972 | Culbert et al. | 55/319 |
| 3,641,746 | 2/1972 | Smith et al. | 55/385.3 |
| 3,648,480 | 3/1972 | Watts | 62/268 |
| 3,796,026 | 3/1974 | Mugford | 55/385.3 |
| 3,934,992 | 1/1976 | Thompson | 55/324 |
| 4,235,298 | 11/1980 | Sackett et al. | 180/54 A |

(List continued on next page.)

FOREIGN PATENT DOCUMENTS

| | | |
|---|---|---|
| 178553 | 5/1954 | Austria . |
| 1034340 | 7/1953 | France . |
| 3836166 | 4/1990 | Germany . |
| 391180 | 4/1933 | United Kingdom . |

*Primary Examiner*—Jay H. Woo
*Assistant Examiner*—Duane S. Smith
*Attorney, Agent, or Firm*—Seed and Berry LLP

[57] ABSTRACT

An air intake system for a cab and engine of a vehicle is shown and described. In a preferred embodiment, dry, ambient air is provided to the cab and engine through a duct that is mounted to an inner surface of a vehicle hood such that the hood forms a top surface of the duct. The duct is relatively narrow across the width of the hood and flares into an air chamber on either side of the hood. An air inlet opening is provided on both sides of the hood such that outside air is drawn into the air chambers. The velocity of the air drops as it passes into and through the air chambers, causing the moisture in the air to separate and drain from the air chambers through an evacuator valve provided in the bottom surface of each chamber. Two openings are provided in the bottom surface of the duct. One opening sealingly engages an opening in the engine air cleaner and the second opening sealingly engages a cab air intake duct, when the hood is in a closed position. A noise suppression baffle is located in the duct adjacent the opening to the engine air intake to help isolate engine noise from the cab, and to prevent the engine air intake from drawing an unacceptable amount of air from the cab air intake.

17 Claims, 3 Drawing Sheets

U.S. PATENT DOCUMENTS

| | | | |
|---|---|---|---|
| 4,366,878 | 1/1983 | Warf | 180/54 A |
| 4,371,047 | 2/1983 | Hale et al. | 180/54 |
| 4,373,940 | 2/1983 | Petersen | 55/328 |
| 4,420,057 | 12/1983 | Omote et al. | 180/54 A |
| 4,454,926 | 6/1984 | Akins | 180/68.1 |
| 4,509,962 | 4/1985 | Breitman et al. | 55/385.3 |
| 4,516,650 | 5/1985 | Yamaguchi et al. | 180/68.3 |
| 4,699,639 | 10/1987 | Gieseke et al. | 55/385.3 |
| 4,831,981 | 5/1989 | Kitano | 123/198 |
| 4,878,555 | 11/1989 | Yasunaga et al. | 180/68.3 |
| 4,932,490 | 6/1990 | Dewey | 180/68.3 |
| 4,971,172 | 11/1990 | Hoffman et al. | 180/68.3 |
| 5,022,479 | 6/1991 | Kiser et al. | 454/147 |
| 5,034,036 | 7/1991 | Creek et al. | 55/385.3 |
| 5,042,603 | 8/1991 | Olson | 180/68.3 |
| 5,139,458 | 8/1992 | Koukal et al. | 454/147 |

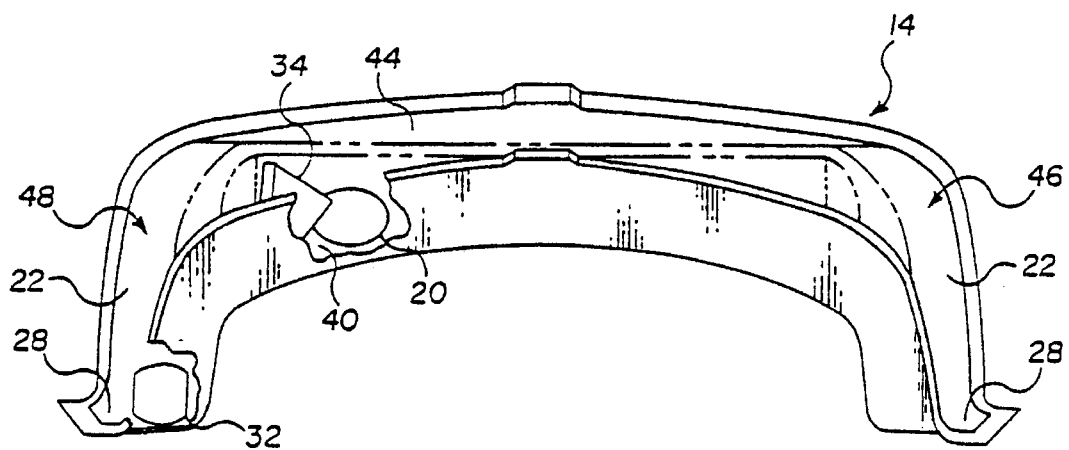
FIG. 3
FIG. 4
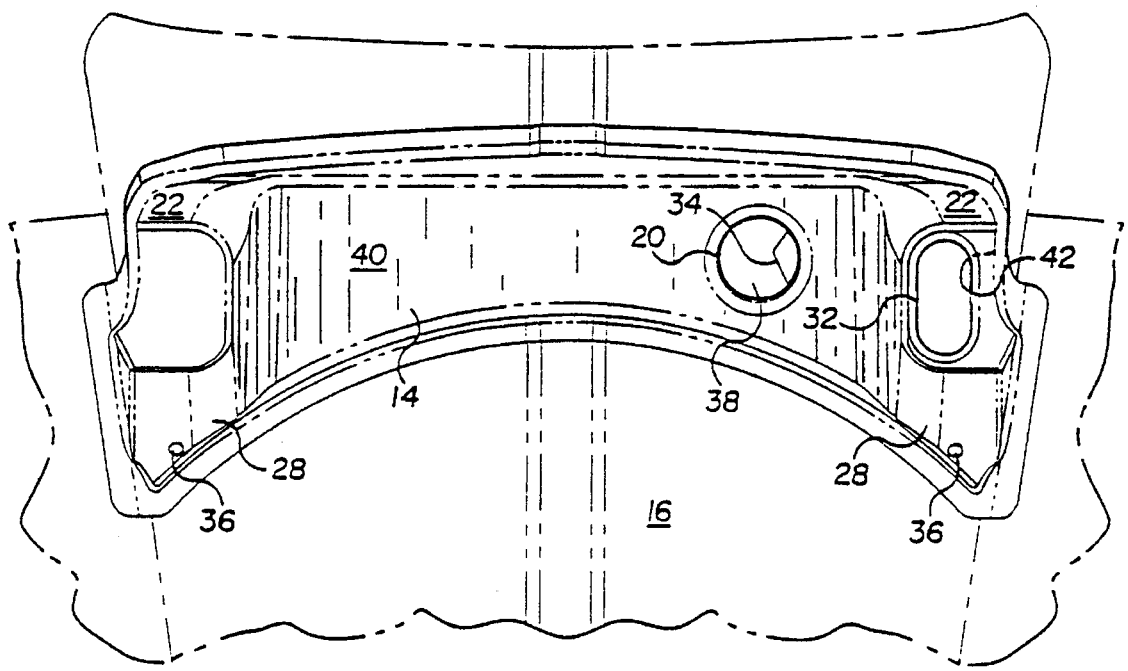

INTEGRAL CAB AND ENGINE AIR INTAKE SYSTEM FOR A VEHICLE

CROSS-REFERENCE TO RELATED APPLICATION

This application is a continuation of U.S. patent application Ser. No. 08/188,541, filed Jan. 28, 1994, now abandoned.

TECHNICAL FIELD

This invention relates to air intake systems for vehicles, and more particularly, to an integral cab and engine air intake system.

BACKGROUND OF THE INVENTION

Currently available air intake system for vehicles typically draw air from the front of a vehicle and deliver the air via different duct systems to the vehicle engine and to the cab. These system have several disadvantages, including the carrying of moisture and contaminants into the engine and cab air system, in addition to being bulky and expensive.

A need therefore exists for an improved air intake system that is efficient at removing moisture and contaminants and that is compatible with aerodynamic, sloped hood designs.

SUMMARY OF THE INVENTION

It is therefore an object of this invention to provide an improved air intake system for a vehicle.

It is another object of this invention to provide an air intake system for a vehicle that will effectively remove moisture and contaminants from the air.

It is another object of this invention to provide an air intake system for a vehicle that is compatible with aerodynamically contoured vehicle hoods.

It is another object of this invention to provide an air intake system for a vehicle that minimizes the cost of manufacturing.

These and other objects of the invention, as will be apparent herein, are accomplished by providing an improved air intake system. In a preferred embodiment, a duct is provided that depends from an inner surface of a hood of the vehicle, such that the inner surface of the hood forms a top surface of the duct. The duct has a relatively narrow central region that extends laterally across the width of the hood, and thereby functions as a stiffening rib for the hood. The narrow central region of the duct flares at either end to form an enlarged pocket or air chamber on either end. The air chambers are in communication with the ambient air via an air intake opening provided on either side of the hood. The duct is provided with a first opening in a bottom surface of the duct which sealingly engages with an air cleaner of an engine when the hood is in a closed position. One of the air chambers of the duct is further provided with a second opening that sealingly engages an opening to the air conditioning and heating unit for the cab, when the hood is shut.

In a preferred embodiment, the air chambers have a sufficiently large volume such that as air passes in through the air intake openings into the air chambers, the velocity of the air decreases, thereby causing moisture and contaminants contained within the air to separate from the air and fall to a bottom region of the air chambers. The duct is further provided with a drain in the bottom surface of each air chamber such that collected moisture and contaminants may be drained from the duct. As a result, the air intake system of the present invention provides dry air to the cab and engine.

The duct is further provided with an air equalizer panel or baffle that is positioned adjacent the first opening or engine air intake, to minimize the drawing of air away from the cab by the engine. The baffle also serves to deflect noise generated by the engine away from the cab air intake, thereby minimizing noise in the cab.

The air intake system of a preferred embodiment of the present invention is located near the fire wall of the cab and meets with the engine and cab air intakes behind and below the engine, thereby allowing for a sloped, aerodynamic hood design.

BRIEF DESCRIPTION OF THE DRAWINGS

FIG. 3 is a front isometric view of a duct of the cab air intake system of FIG. 1, taken along line 3—3 of FIG. 1.

FIG. 4 is a bottom plan view of the air intake system of FIG. 1, taken along line 4—4 of FIG. 1.

DETAILED DESCRIPTION OF THE INVENTION

Figure 1:
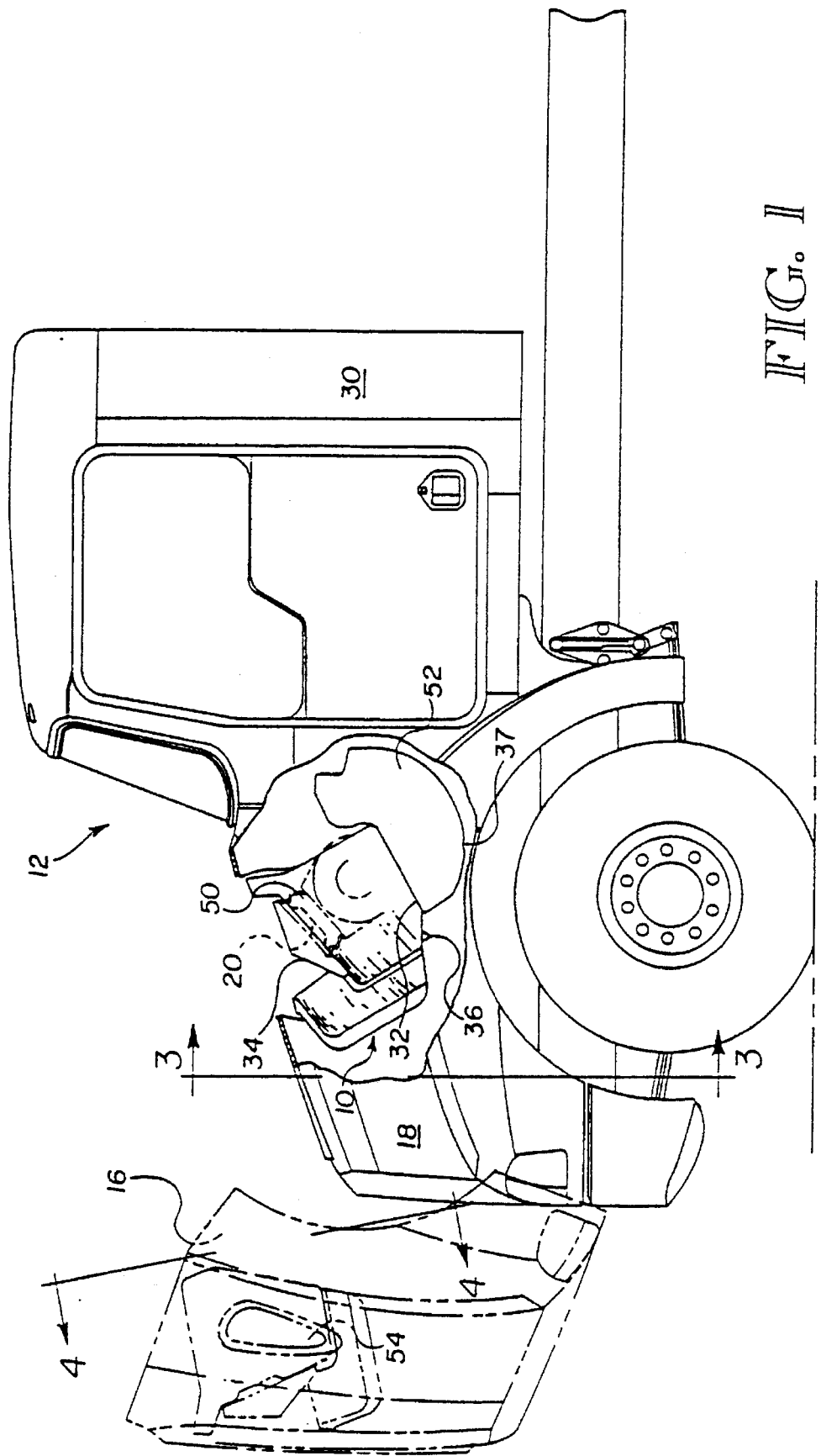
FIG. 1 is a side view of the cab air intake system of the present invention illustrated in the context of a truck cab assembly, with a hood shown in an open and closed position.
Figure 2:
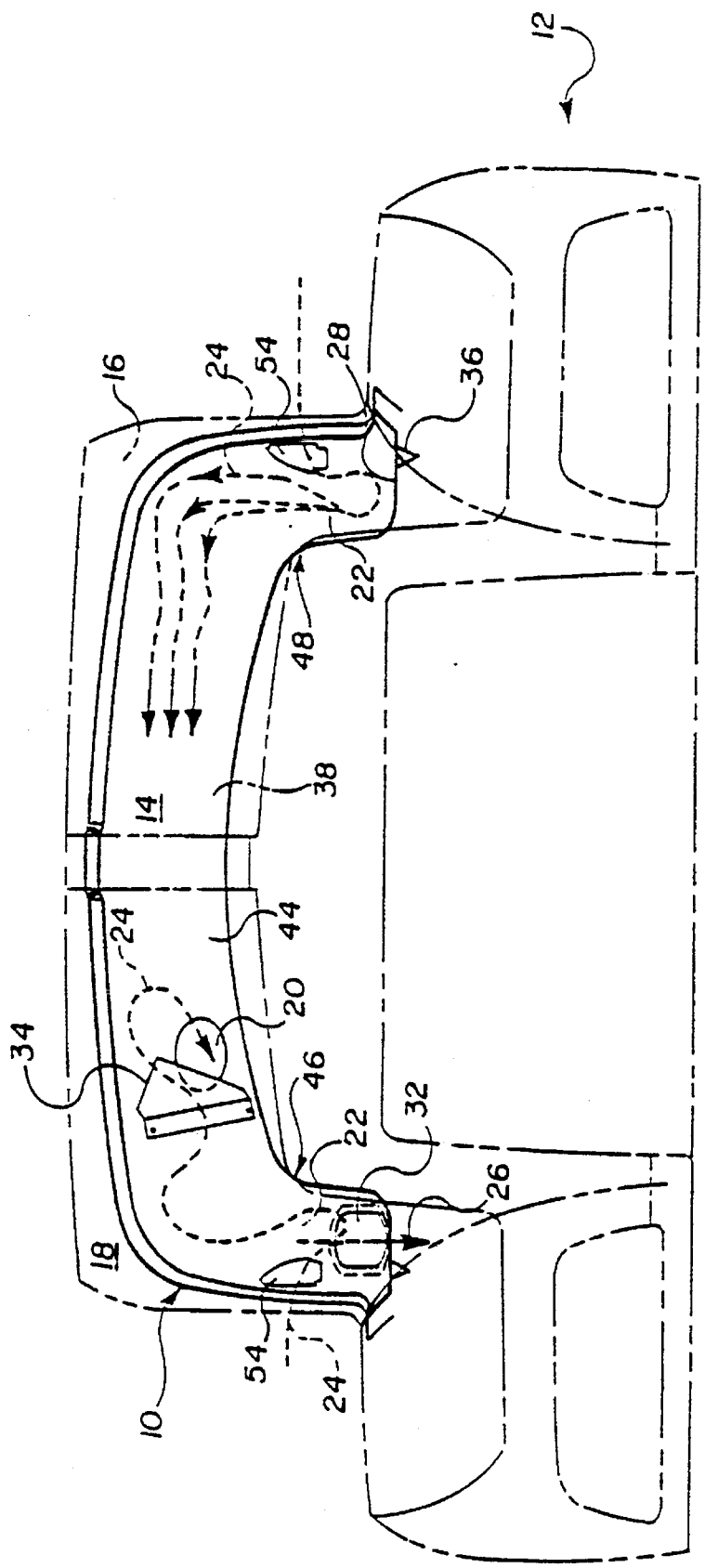
FIG. 2 is a front view of the cab air intake system of FIG. 1.

As illustrated in FIGS. 1 and 2, an air intake system 10 for a vehicle 12, provided in accordance with a preferred embodiment of the present invention, depends from an inner surface 16 of a hood 18 of the vehicle. The air intake system 10 is comprised of an air duct 14 having a narrow central region 44 that flares out at a first end 46 and second end 48 to form enlarged pockets or air chambers 22. In a preferred embodiment, the air duct 14 is integral to the inner surface 16 of the vehicle hood 18, such that the inner surface 16 of the vehicle hood forms the top surface 38 of air duct 14 and the inner surface 42 of air chambers 22, as illustrated in FIG. 4.

As illustrated in FIGS. 2 and 3, a bottom surface 40 of air duct 14 is provided with a first opening 20, which mates with an opening 50 to the engine, preferably through an air cleaner, when hood 18 is in a closed position. Air duct 14 is further provided with a second opening 32 in a bottom surface 28 of air chamber 22, which sealingly engages cab air intake chamber 52 for the cab air conditioner and heater.

Air chambers 22 are in fluid communication with ambient air outside the vehicle via air intake openings 54 provided in either side of hood 18. The volume of air chambers 22 is sufficiently large such that as air enters the air chambers 22 through air intake openings 54, as illustrated by reference arrows 24, the velocity of the air drops sufficiently such that any moisture and contaminants contained in the air substantially separate from the air and fall to the bottom surface 28 of air chambers 22 as illustrated by reference arrow 26. As illustrated in FIGS. 2 and 4, the bottom surface 28 of each air chamber 22 is provided with a drain 36, preferably a rubber evacuator valve, whereby collected moisture and contaminants are drained from air chambers 22. In addition, as illustrated in FIG. 1, the cab air intake chamber 52 is provided with a drain hole 37 to drain out any moisture that may further separate from the air and collect in cab air intake chamber 52. The air intake system 10 of the present invention thereby provides dry air to the cab and engine via a common air duct 14.

In a preferred embodiment of the present invention, as further illustrated in FIGS. 2 and 3, an air equalizer baffle 34 is provided within air duct 14 and positioned relative to first opening 20 to direct the air and minimize the amount of air the engine air intake draws away from the cab air intake 52. Baffle 34 further serves to direct engine noise away from the cab air intake, thereby minimizing noise within the cab of the vehicle.

By providing air to the vehicle engine and cab in accordance with a preferred embodiment of the present invention, several advantages are achieved. For example, air intake system 10 provides air to the engine and cab through a common duct, thereby simplifying the system and reducing the cost; air duct 14 extends laterally across the width of the inner surface 16 of the hood 18, and thereby acts as a structural brace to the hood; given the contour of the air duct 14, moisture and contaminants are efficiently separated from the air by dropping the pressure and velocity, of the air as it passes through air chambers 22, yet an ample supply of air is provided to the engine and cab given the narrow structure of the central region 44 of duct 14 which acts to accelerate the air flow; and, the air intake system 10 meets with the cab air intake 52 and engine intake 50 behind and to the side of the engine (not shown), such that the system is compatible with a sloped, aerodynamically contoured hood design.

An air intake system for a vehicle has been shown and described. From the foregoing, it will be appreciated that, although embodiments of the invention have been described herein for purposes of illustration, various modifications may be made without deviating from the spirit of the invention. Thus, the present invention is not limited to the embodiments described herein, but rather is defined by the claims which follow.

We claim:

1. An air intake system for a vehicle comprising:

an air duct depending from an inner surface of a vehicle hood, the air duct being provided with a first opening to allow fluid communication between the air duct and an engine air intake of the vehicle, and being provided with an air chamber depending from the inner surface of the vehicle hood that is in fluid communication with ambient air which contains moisture, the air chamber being adjacent an ambient air intake provided in the vehicle hood, the air chamber being provided with a bottom surface and with a second opening to allow fluid communication between the air chamber and a cab of the vehicle, the air chamber having a sufficiently large volume so that a velocity of the ambient air as it enters the air chamber drops sufficiently to cause a substantial amount of the moisture to separate from the air and drop to the bottom surface of the air chamber, whereby substantially dry ambient air is provided to the engine and the cab.

2. The air intake system according to claim 1, further comprising:

an air equalizer baffle positioned within the air duct adjacent the first opening to direct the air and to direct noise generated by the engine away from the second opening, thereby minimizing noise in the cab.

3. The air intake system according to claim 1, further comprising:

a drain located in the bottom surface of the air chamber whereby the moisture removed from the air may be drained from the air chamber.

4. The air intake system according to claim 1 wherein the air duct is integral to the inner surface of the hood such that the inner surface of the hood forms a top surface of the air duct and the first opening is provided in a bottom surface of the air duct.

5. The air intake system according to claim 4 wherein the air chamber is integral to the air duct and to the hood such that the inner surface of the hood forms an inner surface of the air chamber.

6. An air intake system for a vehicle comprising:

an air duct depending from an inner surface of a vehicle hood, the air duct having a narrow central region that expands at an end, the air duct being provided with a first opening to allow fluid communication between the air duct and an engine air intake of the vehicle and with a second opening to allow fluid communication between the air duct and a cab of the vehicle, the end of the air duct being in fluid communication with ambient air via an ambient air intake opening provided in the end of the air duct, and the end of the air and the end of the air duct having a sufficiently large volume so that a velocity of the ambient air as it enters the end of the air duct drops sufficiently whereby a substantial amount of moisture that is contained in the air separates from the air and drops to a bottom surface of the air duct, such that substantially dry ambient air is provided to the engine and the cab.

7. The air intake system according to claim 6, further comprising:

an air equalizer baffle positioned within the duct adjacent the first opening to direct the air and to direct noise from the engine away from the second opening, thereby minimizing noise in the cab.

8. The air intake system according to claim 6, further comprising:

a drain located in the bottom surface of the air duct whereby the moisture removed from the air may be drained from the air duct.

9. The air intake system according to claim 6 wherein the air duct is integral to the inner surface of the hood such that the inner surface of the hood forms a top surface of the air duct and the first and second openings are provided in a bottom surface of the air duct.

10. An air intake system for a vehicle comprising:

an air duct depending from and extending laterally along an inner surface of a vehicle hood, the air duct flaring at a first and a second end to form an air chamber at the first and second ends of the air duct;

the air duct being provided with a first opening that sealingly engages an opening to the engine when the hood is in a closed position;

the air chamber being provided with a second opening that sealingly engages an opening to a cab of the vehicle when the hood is in a closed position; and wherein the air chamber of the duct is in fluid communication with ambient air via an air intake opening provided in the hood, the air chamber being adjacent the air intake opening, and the air chamber has a sufficiently large volume whereby a velocity of the ambient air as it enters the air chamber drops sufficiently to cause a substantial amount of moisture that may be contained in the air to separate from the air and drop to a bottom surface of the air chamber, whereby substantially dry ambient air is provided to the engine and the cab.

11. The air intake system according to claim 10, further comprising:

an air equalizer baffle positioned within the duct adjacent the first opening to direct the air and to direct noise from the engine away from the second opening, thereby minimizing noise in the cab.

12. The air intake system according to claim 10, further comprising:

a drain located in the bottom surface of the air chamber whereby the moisture removed from the air may be drained from the air chamber.

13. The air intake system according to claim 10 wherein the air duct and the air chamber are integral to the inner surface of the hood such that the inner surface of the hood forms a top surface of the air duct and the air chamber, and wherein the first opening is provided in a bottom surface of the air duct and the second opening is provided in a bottom surface of the air chamber.

14. An air intake system for a vehicle comprising:

an air duct depending from an inner surface of a vehicle hood, the air duct being provided with a first opening to allow fluid communication between the air duct and an engine air intake of the vehicle, and being provided with an air chamber depending from the inner surface of a vehicle hood that is in fluid communication with ambient air, the air chamber being provided with a second opening to allow fluid communication between the air chamber and a cab of the vehicle.

15. An air intake system for a vehicle, comprising:

an air duct depending from an inner surface of a vehicle hood, the air duct being provided with a first opening to allow fluid communication between the air duct and a selected portion of the vehicle, a region of the air duct being in fluid communication with ambient air via an ambient air intake opening provided in the region of the air duct, and the region of the air duct having a sufficiently large volume so that a velocity of the ambient air as it enters the region of the air duct drops sufficiently to cause a substantial amount of moisture that may be contained in the air to separate from the air and drop to a bottom surface of the air duct, such that air that is more dry than ambient air is provided to the selected portion of the vehicle.

16. The air intake system according to claim 15 wherein the selected portion of the vehicle includes an engine air intake of the vehicle and the first opening allows the air duct to be in fluid communication with the engine air intake.

17. The air intake system according to claim 15 wherein the selected portion of the vehicle includes a cab of the vehicle and the first opening allows the air duct to be in fluid communication with the cab.

* * * * *